United States Patent Office 3,662,005
Patented May 9, 1972

3,662,005
ALKYLATION OF ALKOXY-SUBSTITUTED AROMATIC COMPOUNDS
George L. Hervert, Woodstock, Ill., assignor to Universal Oil Products Company, Des Plaines, Ill.
No Drawing. Continuation-in-part of application Ser. No. 686,690, Nov. 29, 1967. This application May 25, 1970, Ser. No. 40,453
Int. Cl. C07c 43/20
U.S. Cl. 260—612 D          6 Claims

ABSTRACT OF THE DISCLOSURE

The alkylation of alkoxy-substituted aromatic hydrocarbons is effected in the presence of a novel catalyst comprising a hydrogen fluoride-carbon dioxide complex to prepare alkylated alkoxy-substituted aromatic compounds.

CROSS REFERENCE TO RELATED APPLICATION

This application is a continuation-in-part of my co-pending application Ser. No. 686,690 filed Nov. 29, 1967 and now Pat. No. 3,531,546.

This invention relates to a process for the alkylation of organic compounds, and particularly, alkoxy-substituted aromatic compounds, in the presence of certain catalytic compositions of matter. More particularly, the invention is concerned with the use of novel catalytic compositions of matter comprising a hydrogen fluoride-carbon dioxide complex to effect the alkylation of certain organic compounds whereby a desirable product is obtained.

Heretofore, it has been known to utilize acidic catalysts to effect certain reactions involving organic compounds such as hydrocarbons or substituted hydrocarbons. These acidic catalysts which have been used in the prior art include sulfuric acid, hydrogen fluoride, etc. However, when utilizing these catalysts only limited yields of the more desirable products are obtained. In order to increase the yield of the desirable products, it is necessary to modify the catalyst system.

Certain alkylated alkoxy-substituted aromatic compounds constitute useful intermediates in the chemical industry. For example, t-butylanisole is useful as an intermediate in the preparation of butylated hydroxyanisole which is well-known as an antioxidant for fats and oils and also as an antioxidant for food packaging. In addition, other alkyl-substituted alkoxy aromatic compounds such as isopropyl-anisoles or ethylanisoles may be useful as solvents, in perfumery, or as vermicides.

It is therefore an object of this invention to provide a process for effecting certain organic reactions in the presence of a novel catalyst system.

A further object of this invention is to provide a process for effecting certain organic reactions such as the alkylation of alkoxy-substituted aromatic compounds in the presence of a novel catalyst system comprising a hydrogen fluoride-carbon dioxide complex.

In one aspect an embodiment of this invention resides in a process for the liquid phase alkylation of an alkoxy-substituted aromatic compound by condensing said compound with an alkylating agent in the presence of an alkylation catalyst at a temperature in the range from about —20° to about 150° C. and a pressure in the range from about 10 to about 2,000 pounds per square inch, the improvement which comprises utilizing as said catalyst a hydrogen fluoride-carbon dioxide complex containing from about 0.1 to about 95 wt. percent hydrogen fluoride.

A specific embodiment of this invention is found in the process for the alkylation of anisole which comprises condensing said anisole with isobutene in the presence of a catalyst comprising a hydrogen fluoride-carbon dioxide complex containing from about 0.1 to about 95 wt. percent of hydrogen fluoride at a temperature in the range from about —20° to about 150° C. and a pressure in the range from about 10 to about 2,000 pounds per square inch, and recovering the resultant t-butylanisole.

Other objects and embodiments will be found in the following further detailed description of the present invention.

As hereinbefore set forth, the present invention is concerned with the process for effecting the alkylation of alkoxy-substituted compounds in the presence of a catalyst comprising a hydrogen fluoride-carbon dioxide complex. By utilizing the catalyst complex of the present invention, it is possible to modify the alkylation of these compounds in order to obtain a preferred product distribution. In addition, it is possible to effect the alkylation of aromatic hydrocarbons utilizing a lesser amount of the catalyst, thereby effecting corresponding decrease in the overall cost of the operation. In addition to utilizing a lower inventory of hydrogen fluoride, it is also possible, by utilizing the catalyst complex of the present invention, to obtain an increased solubility of the reactants along with increased acidity of the reaction. This will lead in many instances to an isomerization reaction whereby the more desired isomers of the product are obtained. Furthermore, by utilizing the catalytic compounds of the present invention, it will be possible to obtain more primary alkylation reactions with the corresponding decrease in secondary and tertiary alkylation. This will, of course, be preferred when the desired product comprises a mono-alkylated alkoxy-substituted aromatic compound rather than di- or polyalkylated products.

Examples of alkoxy-substituted aromatic compounds which may undergo alkylation according to the process of this invention will include, anisole, ethoxybenzene, propoxybenzene, isopropoxybenzene, butoxybenzene, sec-butoxybenzene, t-butoxybenzene, pentoxybenzene, etc. It is also contemplated within the scope of this invention that alkoxy-substituted aromatic compounds which contain other substituents may also be subjected to alkylation although not necessarily with equivalent results. Specific examples of these compounds will include o-methylanisole, m-methylanisole, p-methylanisole, o-ethylanisole, m-ethylanisole, p-ethylanisole, o-methoxyphenol(guaiacol), m-methoxyphenol(resorcinol methyl ether), p-methoxyphenol(hydroquinone methyl ether), o-ethoxyphenol (guaethol), m-ethoxyphenol(resorcinol ethyl ether), p-ethoxyphenol(hydroquinone ethyl ether), etc. It is to be understood that the aforementioned alkoxy-substituted aromatic compounds are only representative of the class of compounds which may undergo alkylation, and that the present invention is not necessarily limited thereto.

The alkylation agent which may be utilized as one of the starting materials of the process of this invention will include olefinic hydrocarbons such as ethylene, propylene, 1-butene, 2-butene, 1-pentene, 2-pentene, 1-hexene, 2-hexene, 3-hexene, the isomeric straight chain olefin carbon atom up to about 20 carbon atoms including the heptenes, nonenes, decenes, undecenes, dodecenes, tridecenes, tetradecenes, pentadecenes, hexadecenes, heptadecenes, octadecenes, nonadecenes, eicosenes, etc., as well as branched chain isomers thereof. In addition, it is also contemplated within the scope of this invention that carbohydrates may also be used to effect the alkylation of alkoxy-substituted aromatic compounds, although not necessarily with equivalent results. Examples of carbohydrates that may be utilized as alkylating agents for the aromatic compounds include aldohexoses, and their di-, tri- and poly forms. Simple aldohexoses which may be used include mannose, glucose, idose, gulose, galactose, talose, allose, and altrose. Utilizable aldohexose disaccharides which may be used include turanose, maltose, lactose, trehalose, etc. Various poly saccharides which yield aldohexoses during the reaction are also utilizable and will include starch, cellulose, dextran, etc.

The catalyst composition of the present invention comprises a hydrogen fluoride-carbon dioxide complex, said complex being formed due to the fact that hydrogen fluoride is miscible with the carbon dioxide. The hydrogen fluoride may be present in the catalyst complex in a range of from about 0.1 to about 95 weight percent of catalyst complex. In addition to the miscibility of the hydrogen fluoride with the carbon dioxide, in some instances it has been found that the reactant which is to undergo alkylation, isomerization, etc., may also be miscible with the carbon dioxide and thus a single phase may be used to effect the reaction. By utilizing this single phase, it is possible that a sizable reduction in the catalyst-reactant ratio may be effected as well as being able to utilize shorter contact times.

It is contemplated within the scope of this invention that the organic reactions which are to be effected utilizing the hydrogen fluoride-carbon dioxide complex may be effected at temperatures ranging from about −20° C. up to about 150° C. and at pressures within the range of from about 10 to about 2,000 pounds per square inch, the most important consideration being that the reaction be effected under optimum conditions so that the maximum amount of hydrogen fluoride is miscible with the carbon dioxide in the liquid phase.

The process of this invention may be effected in any suitable manner and may comprise either a batch or continuous type operation. For example, when a batch type operation is used, a quantity of the alkoxy-substituted aromatic hydrocarbon which is to be reacted is placed in an appropriate apparatus such as, for example, a stirred or rotated autoclave which contains the catalyst system comprising a hydrogen fluoride-carbon dioxide complex. If, for example, the organic reaction which is to be effected is an alkylation reaction, the alkylating agent is thereafter charged to the reactor which is maintained at the proper operating conditions of temperature and pressure for a predetermined residence time. At the end of this time, the reactor and contents thereof are allowed to return to room temperature and atmospheric pressure. At this point, when the vessel is returned to atmospheric pressure, the carbon dioxide and an appreciable amount of hydrogen fluoride will leave the reactor. The vessel is opened and the reaction mixture is separated from the remainder of the hydrogen fluoride in the catalyst system by conventional means and thereafter subjected to separation means such as fractional distillation, crystallization, etc., whereby the desired product which contains the modification of the products which are usually obtained with conventional catalysts is recovered.

It is also contemplated within the scope of this invention that the process may be effected in a continual manner of operation. When such a type of operation is used, a quantity of the alkoxy-substituted aromatic hydrocarbon and alkylating agents is continuously charged to the reaction zone which is maintained at the proper operating conditions of temperature and pressure. In addition, the catalyst complex is also continuously charged to the reaction zone through separate means. It is contemplated that the catalyst system may be prepared prior to entry into said reactor and charged thereto as a hydrogen fluoride-carbon dioxide complex, or the hydrogen fluoride and carbon dioxide may be charged to the reactor through separate means and admixed therein to form the catalyst complex in situ. Upon completion of the desired residence time, the reactor effluent is continuously withdrawn, the unreacted starting materials and catalyst complex are separated from the effluent and the latter is then subjected to fractionation means whereby the desired product is recovered.

The following examples are given to illustrate the process of the present invention which, however, are not intended to limit the generally broad scope of the present invention in strict accordance therewith.

Example I

A mixture consisting of 4 moles of anisole and 12 moles of hydrogen fluoride is placed in a turbomixer autoclave. Following this, carbon dioxide is pressed into the reactor until 30 wt. percent of the catalyst phase is charged thereto. Thereafter, 1 mole of isobutene is charged to the autoclave which is maintained at a temperature of approximately 5° C. by means of an ice bath. Upon completion of the desired residence time of 3 hours in duration, the reactor is purged of the hydrogen fluoride by releasing the reactor pressure and then passing a stream of nitrogen through the reactor for a period of 2 hours. The turbomixer is then opened and the reaction mixture transferred therefrom and water washed. A pentane solvent is used to scavenge the reactor and the washings are then combined with the bulk reaction product. The hydrocarbon layer is then separated from the dilute catalyst phase and neutralized by the addition of calcium carbonate. Following filtration to remove the calcium carbonate, the hydrocarbon phase is subjected to distillation. The desired product comprising a mixture of isomeric t-butylanisoles is recovered.

When repeating the above experiment utilizing a catalyst comprising 20 moles percent of the hydrogen fluoride and no carbon dioxide, the yield of isomeric t-butylanisoles will be greatly decreased, the yield being contaminated by the presence of di-t-butylanisoles.

Example II

To the turbomixer autoclave is charged 4 moles of anisole and 12 moles of hydrogen fluoride. The turbomixer is sealed and carbon dioxide is pressured therein until its concentration equals 25 wt. percent of the catalyst phase. Thereafter, propylene is charged to the reactor and the reaction allowed to proceed for a period of about 3 hours while maintaining the temperature of the reactor at approximately 5° C. by means of an ice bath. At the end of the reaction period the reactor pressure is released and the autoclave is purged by passing a stream of nitrogen therethrough for a period of 2 hours. The reactor is then opened and the reaction product is recovered therefrom. After washing the autoclave with a pentane solvent which is added to the bulk product, the latter is water-washed and the hydrocarbon layer is separated from the aqueous catalyst layer and neutralized by the addition of calcium carbonate, thus removing the residual traces of hydrogen fluoride. The mixture is then filtered and subjected to fractional distillation to remove the solvent and unreacted anisole. Further distillation will result in the recovery of the desired product comprising a mixture of isomeric isopropylanisoles.

A repeat of this experiment utilizing a catalyst which consists only of hydrogen fluoride will result in the formation of a lesser amount of the isopropylanisoles.

Example III

In this example, ethoxybenzene is alkylated in the manner similar to that set forth in the above examples utilizing a catalyst comprising 12 moles of hydrogen fluoride and a sufficient amount of carbon dioxide to equal 30% of the catalyst phase, the alkylating agent being propylene. After a reaction period of 3 hours at 5° C. has been completed, the reaction product is recovered and treated in a manner hereinbefore set forth. The desired product comprising a mixture of isomeric isopropylethoxybenzenes will be recovered.

When the process described in the above paragraph is repeated utilizing only hydrogen fluoride as the alkylation catalyst with no carbon dioxide added, the result will be a lower yield of the desired isopropylethoxybenzenes.

Example V

A mixture of 4 moles of propoxybenzene, 1 mole of dodecene-1, and 11.5 moles of hydrogen fluoride is placed in the turbomixer autoclave. The autoclave is maintained at a temperature of about 5° C. while carbon dioxide is pressured therein until its concentration equals 28 wt. percent of the catalyst phase. At the end of 2.5 hours of contact time the autoclave pressure is released and it is purged by means of a stream of nitrogen whereby the hydrogen fluoride will be removed. The apparatus is opened and the reaction is recovered therefrom. Following this a pentane solvent is used to scavenge the autoclave and the gleanings of the wash are combined with the bulk product and water washed. The organic layer is then separated from the dilute aqueous catalyst layer, neutralized with calcium carbonate to remove traces of residual hydrogen fluoride and subjected to fractional distillation steps whereby the desired product comprising a mixture of isomeric dodecylpropoxybenzenes is recovered.

When repeating the alkylation of propoxybenzene with dodecene-1 utilizing a catalyst system which contains only 21 moles of hydrogen fluoride rather than the complex of the present invention comprising a hydrogen fluoride-carbon dioxide mixture, it is found that the yield of the desired dodecylpropoxybenzene is less than that which is obtained when utilizing the complex, the desired product being contaminated by the presence of a greater amount of didodecylpropoxybenzenes.

Example V

In this example, a mixture of 4 moles of anisole, 1 mole of octene-1, and 11.5 moles of hydrogen fluoride is placed in a turbomixer autoclave which is maintained at a temperature of about 5° C. by means of an ice bath. Carbon dioxide is then pressured in until an amount equal to that of about 30 wt. percent of the catalyst phase is charged. After a total contact time of 2.5 hours is passed, the turbomixer is purged with a stream of nitrogen for a period of 2 hours after the pressure has been released to remove the hydrogen fluoride. The autoclave is opened and the reaction mixture is treated in a manner similar to that set forth in the above examples. After neutralization with calcium carbonate and filtration, distillation of the organic layer will result in the recovery of the desired product comprising a mixture of isomeric octylanisoles.

When repeating this experiment utilizing only hydrogen fluoride as the alkylation catalyst, there will be found that a lesser amount of octylanisoles will be formed.

I claim as my invention:

1. In a process for the liquid phase alkylation of an alkoxy-substituted aromatic compound by condensing said compound with an olefinic hydrocarbon in the presence of an alkylation catalyst at a temperature in the range from about −20° to about 150° C. and a pressure in the range of from about 10 to about 2,000 pounds per square inch, the improvement which comprises utilizing as said catalyst a hydrogen fluoride-carbon dioxide complex containing from about 0.1 to about 95 wt. percent hydrogen fluoride.

2. The process as set forth in claim 1 in which said alkoxy-substituted aromatic compound is an anisole, said alkylating agent is isobutene, and the alkylated alkoxy-substituted aromatic compound is t-butylanisole.

3. The process as set forth in claim 1 in which said alkoxy-substituted aromatic compound is an anisole, said alkylating agent is propylene, and the alkylated alkoxy-substituted aromatic comypound is isopropylanisole.

4. The process as set forth in claim 1 in which said alkoxy-substituted aromatic compound is ethoxybenzene, said alkylating agent is propylene, and the alkylated alkoxy-substituted aromatic compound is isopropylethoxybenzene.

5. The process as set forth in claim 1 in which said alkoxy-substituted aromatic compound is propoxybenzene, said alkylating agent is dodecene-1, and the alkylated alkoxy-substituted aromatic compound is dodecylpropoxybenzene.

6. The process as set forth in claim 1 in which said alkoxy-substituted aromatic compound is anisole, said alkylating agent is octene-1, and the alkylated alkoxy-substituted aromatic compound is octylanisole.

References Cited

UNITED STATES PATENTS

| | | | |
|---|---|---|---|
| 2,275,314 | 3/1942 | Tinker et al. | 260—624 CX |
| 2,378,763 | 6/1945 | Frey | 260—671 CX |
| 2,384,294 | 9/1945 | Frey | 260—671 C |
| 2,859,251 | 11/1958 | Linn | 260—624 C |
| 2,910,522 | 10/1959 | Gerhold et al. | 260—624 CX |

BERNARD HELFIN, Primary Examiner

U.S. Cl. X.R.

260—613 D